(12) United States Patent
Tobiason

(10) Patent No.: US 7,433,128 B1
(45) Date of Patent: Oct. 7, 2008

(54) ADAPTIVE LIGHT-PATH SURFACE TILT SENSOR FOR MACHINE VISION INSPECTION

(75) Inventor: Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/694,795

(22) Filed: Mar. 30, 2007

(51) Int. Cl.
*G02B 27/10* (2006.01)

(52) U.S. Cl. ........................ 359/627; 359/629
(58) Field of Classification Search ............ 348/208.99; 359/554, 629, 656–661, 627, 55, 208; 396/52; 250/214
See application file for complete search history.

(56) References Cited

U.S. PATENT DOCUMENTS

| | | | |
|---|---|---|---|
| 7,081,957 B2 * | 7/2006 | Norton | 356/445 |
| 2002/0071145 A1 * | 6/2002 | Roh | 359/35 |
| 2006/0109532 A1 * | 5/2006 | Savas et al. | 359/10 |

OTHER PUBLICATIONS

"QVPAK 3D CNC Vision Measuring Machine Operation Guide," Mitutoyo Corporation & Micro Encoder Inc., Kanagawa, Japan, Sep. 1996.
"QVPAK 3D CNC Vision Measuring Machine User's Guide Version 7," Mitutoyo Corporation & Micro Encoder Inc., Kanagawa, Japan, Jan./Sep. 2003.

* cited by examiner

*Primary Examiner*—Hung X. Dang
*Assistant Examiner*—Vipin M Patel
(74) *Attorney, Agent, or Firm*—Christensen O'Connor Johnson Kindness PLLC

(57) ABSTRACT

An adaptive light-path surface tilt sensing configuration is provided that identifies when a ray bundle is projected along a direction normal to a workpiece surface. As a result, the tilt of the workpiece surface may be determined. The surface tilt sensor may comprise an illumination and detector portion and an objective lens. The illumination and detector portion may comprise a light source, a collimating lens, a beamsplitter, a controllable ray bundle position control portion, and a photodetector configuration. These elements are configured to provide a ray bundle alignment sensing arrangement that provides a signal indicating when a projected ray bundle and a reflected ray bundle have the best degree of alignment, in addition to other functions. The best degree of alignment corresponds to a ray bundle that is projected along the direction normal to the workpiece surface provides.

24 Claims, 6 Drawing Sheets

ADAPTIVE LIGHT-PATH SURFACE TILT SENSOR FOR MACHINE VISION INSPECTION

FIELD OF THE INVENTION

The invention relates generally to metrology systems, and more particularly to an adaptive light-path surface tilt sensor that may be utilized as part of a machine vision inspection system.

BACKGROUND OF THE INVENTION

Precision machine vision inspection systems (or "vision systems" for short) can be used to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. Such systems are known to incorporate various types of surface height measurement sensors, either as built in features or as accessories. However, efficient surface tilt measurement systems that may be incorporated in such systems are not generally known.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed toward and adaptive light-path surface tilt sensing configuration or sensor that can be used to identify when a ray bundle is projected along a direction normal to a point on a workpiece surface. As a result, the tilt of the workpiece surface may be determined. Other properties of the surface may then be determined more reliably, if desired. Such a sensor is of particular utility in a general purpose machine vision inspection system for performing precision dimensional metrology and other types of inspection.

In accordance with one aspect of the invention, the essential elements of the adaptive light-path surface tilt sensor may comprise an illumination and detector portion and an objective lens. The illumination and detector portion may comprise a light source, a collimating lens, a beamsplitter, a ray bundle position control portion, and a photodetector configuration. The elements of the illumination and detector portion are configured to provide a ray bundle alignment sensing arrangement, in addition to other functions. In various embodiments the ray illumination and detector portion is configured to output an illuminating beam from the light source through an arrangement of the beamsplitter, the ray bundle position control portion, and the collimating lens, to provide a collimated projected ray bundle at a projected ray bundle position. In various respective embodiments, the beamsplitter, the ray bundle position control portion, and the collimating lens may be arranged in various respective orders along a beam path, as disclosed in greater detail below. The projected ray bundle is input to the objective lens, which focuses the projected ray bundle onto a workpiece surface along a direction of incidence. A reflected ray bundle from the workpiece surface is input by the objective lens and transmitted to the ray bundle alignment sensing arrangement, which outputs a measurement signal that is usable to determine the degree of alignment between the projected ray bundle and the reflected ray bundle. The ray bundle position control portion may be controlled to provide a plurality of respective projected ray bundles corresponding to respective measurement signals, including a projected ray bundle that is projected along the direction normal to the workpiece surface. A ray bundle that is projected along the direction normal to the workpiece surface corresponds to a respective measurement signal indicating the best degree of alignment. In various embodiments, the ray bundle position control portion may comprise a spatial light modulator. In various embodiments, the spatial light modulator may comprise one of a transmissive pixel array and a reflective micro-mirror array.

According to a further aspect of the invention, in one embodiment, the ray bundle alignment sensing arrangement may comprise the ray bundle position control portion and a photodetector configuration, wherein the reflected ray bundle is transmitted to the ray bundle position control portion, which spatially filters the reflected ray bundle using an aperture, to provide an amount of spatially filtered measurement signal light. The amount of spatially filtered measurement signal light is input to a photodetector configuration that outputs a measurement signal that has a value corresponding to the amount of spatially filtered measurement signal light. In such an embodiment, when the reflected ray bundle returns along the path of the projected ray bundle it may fully coincide with the aperture and the measurement signal value may be maximized, corresponding to the ray bundle that is projected along the direction normal to the workpiece surface.

According to a further aspect of the invention, in one embodiment, the ray bundle alignment sensing arrangement may comprise a two dimensional (2D) photodetector array, wherein the reflected ray bundle is transmitted to the (2D) photodetector array, which outputs a measurement signal that indicates a spot position of the reflected ray bundle on the 2D array. An alignment calibration or mapping is provided that pairs each 2D photodetector spot position to a corresponding configuration characteristic of the ray bundle position control portion (e.g. an 2D aperture position provided by the ray bundle position control portion or a set of control signal components used to provide a projected ray bundle position), under the condition that the projected and reflected ray bundles are normal to the workpiece surface for the paired positions and configuration characteristics. The alignment mapping may be determined based a calibration surface and associated calibration procedure, for example. In such an embodiment, when the reflected ray bundle returns to a spot position on the 2D array that maps to the current configuration characteristic of the ray bundle position control portion, this condition indicates that the current ray bundle is projected along the direction normal to the workpiece surface.

According to a further aspect of the invention, each respective configuration characteristic of the ray bundle position control portion may be mapped using a tilt mapping such that it corresponds to a known respective surface tilt direction, under the condition that the projected ray bundle and the reflected ray bundle are aligned when a projected ray bundle projected according to that respective configuration characteristic of the ray bundle position control portion is projected to a surface having the corresponding known tilt direction.

In accordance with another aspect of the invention, in various embodiments, the illumination and detector portion of the adaptive light-path surface tilt sensor includes a wavelength analyzer that may determine the dominant wavelengths present in measurement signal light that arises from a reflected ray bundle. In one embodiment, a projected ray bundle at a normal incidence to the workpiece surface is used to provide the reflected ray bundle that provides the measurement signal light. The dominant wavelengths and/or their relationship to one another may then be used to determine the thickness of a thin film on the workpiece surface, given a known index of refraction for the thin film.

In accordance with another aspect of the invention, in various embodiments, the adaptive light-path surface tilt sensor may be used to characterize the roughness of the workpiece surface. The adaptive light-path surface tilt sensor is used to measure the relative strength of a plurality of respective reflected ray bundles corresponding to a plurality of respective directions of incidence on the workpiece surface. The relative strengths of the respective reflected ray bundles, as a function of their respective directions of incidence, characterizes the surface roughness.

In accordance with another aspect of the invention, a method is provided for identifying a ray bundle that is projected along a direction normal to a workpiece surface in a machine vision inspection system. In various embodiments, the method may comprise: outputting an illuminating beam from a light source through an arrangement of a beamsplitter, a ray bundle position control portion, and a collimating lens, to provide a collimated projected ray bundle at a projected ray bundle position; inputting the collimated projected ray bundle to a portion of an objective lens; projecting the projected ray bundle from the objective lens such that it is focused on a workpiece surface along a direction of incidence; inputting a reflected ray bundle from the workpiece surface to the objective lens, and outputting the reflected ray bundle to a ray bundle alignment sensing arrangement; using the ray bundle alignment sensing arrangement to provide a measurement signal that is usable to determine the degree of alignment between the projected ray bundle and the reflected ray bundle; and identifying a ray bundle corresponding to the respective measurement signal that indicates the best degree of alignment as the ray bundle that is projected along the direction normal to the workpiece surface.

According to a further aspect of the invention, the objective lens may comprise a lens that is used for acquiring workpiece inspection images in a machine vision inspection system. However, the adaptive light-path surface tilt sensor may also be used as a stand alone surface tilt sensing system.

According to a further aspect of the invention, in various exemplary embodiments the objective lens may comprise a conventional lens, a liquid immersion lens, or a solid immersion lens.

BRIEF DESCRIPTION OF THE DRAWINGS

The foregoing aspects and many of the attendance advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
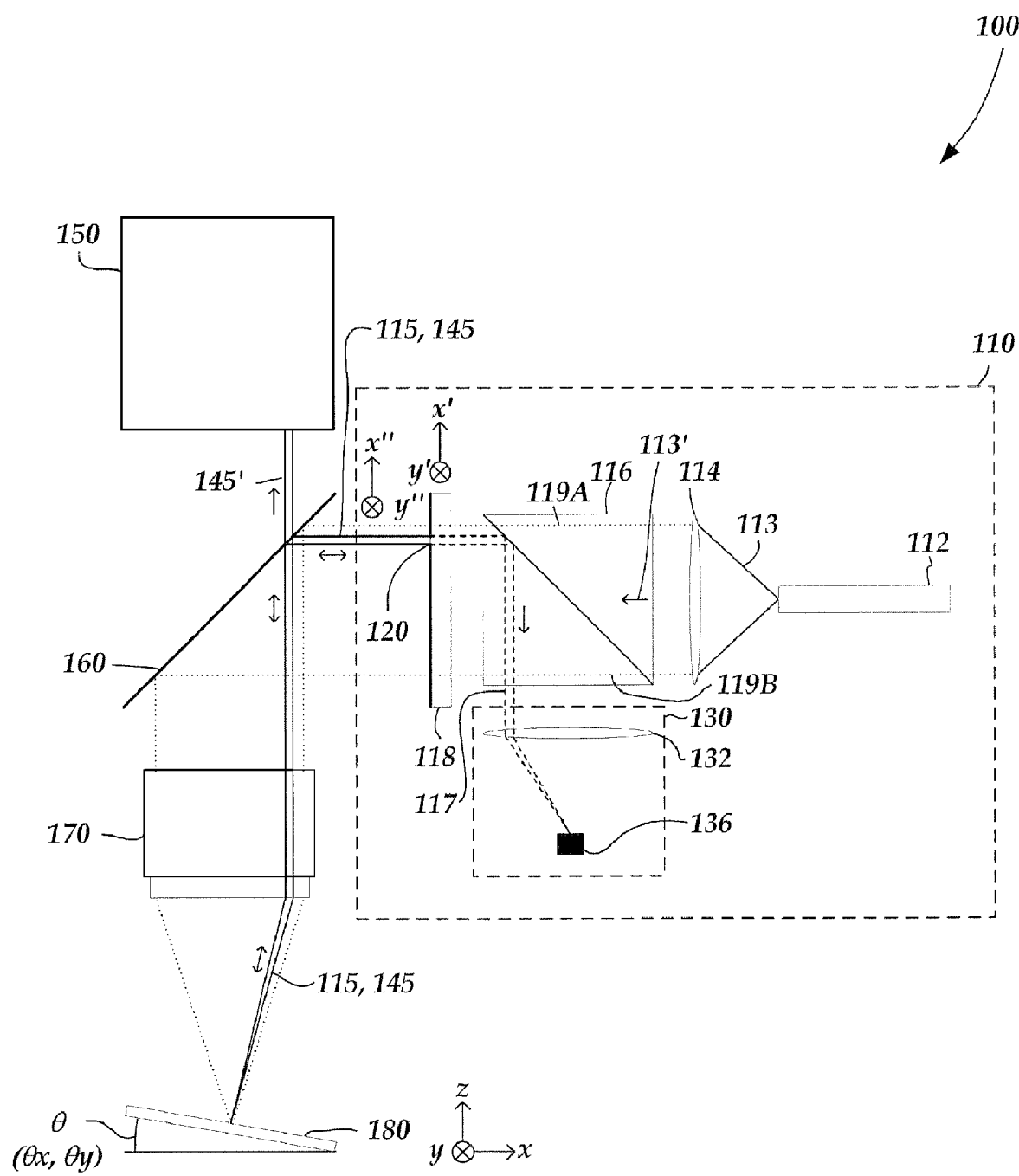
FIG. 1 is a diagram of a first embodiment of an adaptive light-path surface tilt sensor which may provide a ray bundle projected along a direction normal to a workpiece surface, including a first embodiment of an illumination and detector portion.

FIG. 1 is a diagram of a first embodiment of an adaptive light-path surface tilt sensing configuration 100 that may provide a ray bundle projected along a direction normal to a workpiece surface in accordance wit the present invention. The essential elements of the adaptive light-path surface tilt sensing configuration 100 are an illumination and detector portion 110 and an objective lens 170. As shown in FIG. 1, the illumination and detector portion 110 may comprise a light source 112, a collimating lens 114, a beamsplitter 116, a ray bundle position control portion 118 and a photodetector configuration 130. In the embodiment shown in FIG. 1, the adaptive light-path surface tilt sensor 100 is integrated into the imaging portion of machine vision inspection machine, which provides a camera 150, a beamsplitter 160, and the objective lens 170, as shown. The camera 150 and the beamsplitter 160 are not required in various embodiments that may provide a stand-alone adaptive light-path surface tilt sensor according to this invention.

In operation, the light source 112 outputs an illuminating beam 113, which is at least approximately collimated by the collimating lens 114 to provide a collimated illuminating beam 113', which may be used to provide various rays bundles that are output from the illumination and detector portion 110 at ray bundle positions that fall within outer ray limits 119A and 119B, as described below. The collimated illuminating beam 113"is transmitted through the beam splitter 116 and is input to the ray bundle position control portion 118. In the embodiment shown in FIG. 1, the ray bundle position control portion 118 may be characterized as a controllable aperture position adjustment element (e.g. an addressable spatial light modulator) that is controlled to provide an aperture 120 that outputs or projects a projected ray bundle 115 comprising a portion of light from the collimated illuminating beam 113'. It should be appreciated that the position of the aperture 120 may be controlled to vary along x' and y' directions of the ray bundle position control portion 118, to (x',y') positions other than the one illustrated in FIG. 1, in order to control a projection position (x",y") of the projected ray bundle 115 along the x" and y" directions within outer ray limits 119A and 119B, as illustrated in FIG. 1. In the particular embodiment shown in FIG. 1, the projected ray bundle 115 is then reflected by the beamsplitting surface 160 and input to the objective lens 170, which focuses it along a direction of incidence to a workpiece surface 180. The workpiece surface 180 is tilted at a tilt angle θ, which may generally be characterized by two tilt angle components (θx in the x-y plane relative to the x-axis and θy in the y-z plane relative to the y-axis), at the point of reflection, (e.g. the focus location) on the workpiece surface 180. A reflected ray bundle 145 is reflected back from the workpiece surface along a path that depends on the angle θ, and then through the objective lens 170 to the beamsplitter surface 160, where it is reflected back to a ray bundle alignment sensing arrangement of the illumination and detector portion 110. A portion 145' of the reflected ray bundle 145 may also be transmitted to the camera 150, in some embodiments.

In the embodiment shown in FIG. 1, the ray bundle alignment sensing arrangement of the illumination and detector portion 110 comprises the ray bundle position control portion 118 and the photodetector configuration 130. In particular, the ray bundle position control portion 118 spatially filters the reflected ray bundle 145 using the aperture 120, which may transmit a spatially filtered measurement signal light 117 if the reflected ray bundle 145 is at least partially aligned with the aperture 120. In such a case, the spatially filtered measurement signal light 117 may be reflected by the beamsplitter 116 and received by the photodetector configuration 130, as illustrated. In the embodiment shown in FIG. 1, the photodetector configuration 130 comprises a focusing lens 132 and a photodetector 136. The photodetector 136 may output a measurement signal that corresponds to the amount of spatially filtered measurement signal light 117 it receives.

The amount of light received by the photodetector 136 depends upon how much spatially filtered measurement signal light 117 is transmitted by the aperture 120. If the reflected ray bundle 145 does not travel back along a path that at least partially aligned with or overlapping the path of the projected ray bundle 115 at the aperture 120, it will be blocked by the ray bundle position control portion 118 and the corresponding measurement signal will have a minimum value. If the reflected ray bundle 145 is partially aligned with or overlapping the path of the projected ray bundle 115 at the aperture 120, the measurement signal will be greater than the minimum value, and indicative of the degree of alignment or overlap. For the particular tilt angle θ and the particular position of the aperture 120 illustrated in FIG. 1, the projected ray bundle 115 is incident along the direction normal to the workpiece surface 180. Therefore, the reflected ray bundle 145 is fully aligned with the projected ray bundle 115 and retraces its path to approximately coincide with the aperture 120. Under this condition, the amount of spatially filtered signal light 117 is maximized, and the photodetector 136 outputs the maximum measurement signal that may be obtained for the current arrangement of the workpiece surface 180. Conversely, for the embodiment shown in FIG. 1, the maximum measurement signal corresponds to the ray bundle that is projected along the direction that is normal to the workpiece surface 180.

As previously indicated, the ray bundle position control portion 118 may be controlled to vary the position of the aperture 120, e.g. along x' and y' axes of the ray bundle position control portion 118, in order to control a projection position (x",y") of the projected ray bundle 115. In general, when the projected ray bundle 115 is normal to the workpiece surface 180 such that the reflected ray bundle 145 approximately coincides with the aperture 120, that aperture position along the direction of the x' axis corresponds to the θx tilt angle component, and that aperture position along the direction of the y' axis corresponds to the θy tilt angle component. Accordingly, in various embodiments, each respective aperture position may be mapped in a tilt mapping such that it corresponds to a known respective surface tilt direction, under the condition that the measurement signal of the alignment sensing arrangement for that respective aperture position indicates the best degree of alignment when a projected ray bundle projected from that respective aperture position is projected to a surface having the corresponding known tilt direction. The tilt mapping may be stored in an associated signal processing and control circuit of the illumination and detector portion 110, or a host computer, or the like.

As previously indicated, in the embodiment shown in FIG. 1, the ray bundle position control portion 118 may characterized as a controllable aperture position adjustment element. Any now-known or later-developed type of controllable aperture position adjustment element that can provide controllable light outputting and light blocking functions in a desired pattern with a variable position (e.g. by controllable transmission or reflection) may be referred to as a spatial light modulator (SLM). In various embodiments, the ray bundle position control portion 118 may comprise a transmissive-type SLM. The SLM may comprise a light transmitting and blocking element and associated control electronics. In some embodiments, the control electronics may be connected to a host computer (e.g. the host computer of a machine vision inspection system) according to known techniques, and the various surface tilt sensing methods disclosed herein may implemented in an interactive and/or automatically executed control routine. In one embodiment, the transmissive-type SLM may comprise an LCD pixel array that may generally be controlled by conventional video signals, if desired, and that may provide an electronically generated 8-bit gray-scale pattern that may transmit, partially-transmit, or block light through any given pixel of the array, depending on its gray-scale value. In one specific embodiment, a micro-display graphics array and the associated control electronics, available from CRL-Opto in Dunfermline, Scotland, United Kingdom may be used as the ray bundle position control portion 118.

In one embodiment, a SLM with controllable gray-scale is used to provide a partially transmissive aperture 120, rather than fully transmissive aperture 120, in order to prevent highly reflective workpiece surfaces from saturating the photodetector that is used to provide the measuring signal. A SLM with controllable gray-scale may also be used to provide apodization, for example the pixel gray scale levels in the aperture 120 may be chosen to provide a Gaussian intensity profile, to limit diffraction effects from the aperture 120 in the projected ray bundle 115, or for other purposes.

Regarding one aspect of operating the adaptive light-path surface tilt sensing configuration 100, as previously indicated, if the reflected ray bundle 145 does not travel back along a path that is at least partially aligned with or overlapping the path of the projected ray bundle 115 at the aperture 120, it will be blocked by the ray bundle position control portion 118 and no significant measurement signal will result. Accordingly, a search routine may generally be used to find an aperture position that provides a projected ray bundle 115 that is incident along the direction normal to the workpiece surface 180, such that the reflected ray bundle 145 retraces its path to approximately coincide with the aperture 120. In general, such a search routine may comprise controlling the ray bundle position control portion 118 to provide a plurality of respective aperture positions (x',y') and projected ray bundle positions (x",y") that output respective projected ray bundles 115 corresponding to respective measurement signals, including an aperture position that outputs a ray bundle that is projected along the direction normal to the workpiece surface. The ray bundle that is projected along the direction normal to the workpiece may be identified as the ray bundle corresponding to the respective measurement signal that indicates the best degree of alignment (e.g. for the embodiment shown in FIG. 1, the maximum respective measurement signal). In one exemplary search routine, the measurement signal may be sampled and stored while the ray bundle position control portion 118 is controlled to provide each possible aperture position for the aperture 120. The resulting measurements are analyzed to identify the maximum signal and the corresponding aperture position. In another exemplary search routine, the size of the aperture 120 may be varied as well as it position, to provide a coarse-to-fine search capability. For example, an initial coarse aperture may be stepped in relatively coarse steps to project a limited number of ray bundles that together include all possible ray bundles. The corresponding measurement signals may be analyzed to identify the maximum signal and the corresponding coarse aperture position. A finer aperture search may then be executed as outlined above, corresponding to the coarse aperture area at the "maximum signal position", and so on, until a finest desired aperture size has been used to identify an aperture position that projects a ray bundle along the direction normal to the workpiece surface 180. Of course, the foregoing search procedures are exemplary only, and not limiting. Other, more efficient, search procedures are possible. It should be appreciated that an SLM (for example) and detector can be configured to alter the aperture position and measure the resulting signal at a high rate, e.g. 10 KHz, provided that the light source 112 is selected and/or controlled to provide sufficient intensity in the operative ray bundles 115 and 145. Therefore, the foregoing and/or other search approach may be executed at high speed in various embodiments.

In some embodiments, the light source 112 may be a light source having a controllable wavelength and/or polarization. The wavelength and/or polarization may then be selected or varied to provide the best measurement signal, depending on the characteristics of the workpiece surface 180. In one example, a wavelength may be adjusted to discriminate between the surfaces or boundaries of various thin layers of material on a workpiece. In another example, a polarization may be adjusted to at least partially overcome measurement anomalies to a directional texture or the like, on the workpiece surface 180.

Figure 2:
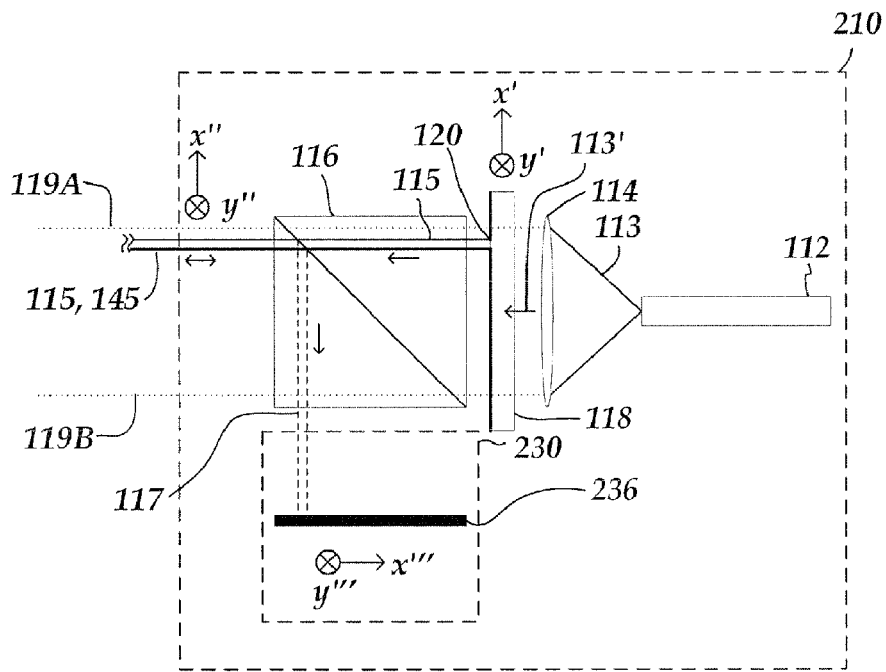
FIG. 2 is a diagram of a second embodiment of an illumination and detector portion of an adaptive light-path surface tilt sensor which may provide a ray bundle projected along a direction normal to a workpiece surface.

FIG. 2 is a diagram of a second embodiment of an illumination and detector portion 210, that may be used in an adaptive light-path surface tilt sensing configuration according to this invention (e.g. in place of the illumination and detector portion 110 in the tilt sensing configuration 100). In operation, the projected ray bundle 115 and the reflected ray bundle 145 may be functionally equivalent to those previously described with reference to FIG. 1. Several of the elements of the illumination and detector portion 210 are also similar to those of the illumination and detector portion 110 of FIG. 1, and similarly numbered components may be similar or identical, except as otherwise described below.

A first difference between the illumination and detector portion 210 and the illumination and detector portion 110 is that the ray bundle position control portion 118 is located in the collimated illuminating beam 113' ahead of the beamsplitter 116, such that only the projected ray bundle 115 is transmitted through the beamsplitter 116. As a result, the reflected ray bundle 145 cannot be spatially filtered by the ray bundle position control portion 118, before it is reflected at the beamsplitter 116 to provide the measurement signal light 117 that is received by the photodetector configuration 130. Therefore, a second difference is that the illumination and detector portion 210 provides a different type of ray bundle alignment sensing arrangement than the illumination and detector portion 110, comprising the ray bundle position control portion 118, a photodetector portion 230 that comprises a 2D photodetector array 236, and an alignment mapping described in greater detail below. The ray bundle alignment sensing arrangement of the illumination and detector portion 210 may operate as follows. The measurement signal light 117 that arises from the reflected ray bundle 145 is received at a spot position (x''',y''') on the 2D photodetector array 236, which outputs a measurement signal that indicates the spot position (e.g. by determining the x''' and y''' coordinates of the centroid of the spot intensity distribution, for example). A predetermined alignment calibration or mapping is provided for the illumination and detector portion 210 (e.g. stored in an associated signal processing and control circuit of the illumination and detector portion 210 or a host computer) that pairs each 2D photodetector spot position to a corresponding 2D aperture position, under the condition that the projected and reflected ray bundles are normal to the workpiece surface for the paired positions. The alignment mapping may be determined based on a calibration surface and associated calibration procedure, for example. In such an embodiment, when a current measurement signal light 117 arising from the reflected ray bundle 145 returns to a spot position (x''',y''') on the 2D array 236 that maps to a current aperture position (x',y') of the aperture 120 on the ray bundle position control portion 118, this condition indicates that the projected ray bundle 115 and the reflected ray bundle 145 are aligned, and that corresponding current projected ray bundle is projected along the direction normal to the workpiece surface. When a current spot position (x''',y''') approaches the alignment mapped position that corresponds to the current aperture position (x',y'), the projected ray bundle 115 and the reflected ray bundle 145 may be approaching alignment. Thus, while previously outlined search routines may be adapted for use with the illumination and detector portion 210, in one embodiment of a search routine that is usable in conjunction with the illumination and detector portion 210 the relationship between the current spot position coordinates (x''',y''') and the current aperture position coordinates (x',y') may be analyzed to estimate a new aperture position that will improve the alignment, thus speeding up the search.

Figure 3:
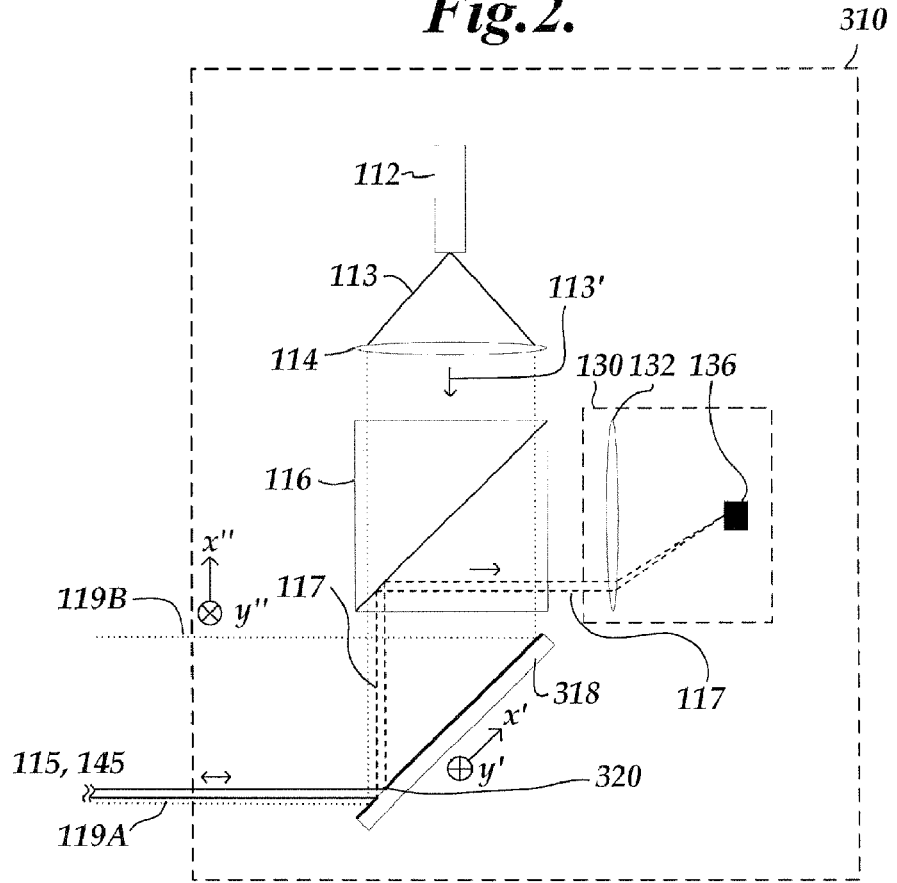
FIG. 3 is a diagram of a third embodiment of an illumination and detector portion of an adaptive light-path surface tilt sensor which may provide a ray bundle projected along a direction normal to workpiece surface.

FIG. 3 is a diagram of a third embodiment of an illumination and detector portion 310, that may be used in an adaptive light-path surface tilt sensing configuration according to this invention (e.g. in place of the illumination and detector portion 110 in the tilt sensing configuration 100). In operation, the projected ray bundle 115 and the reflected ray bundle 145 may be functionally equivalent to those previously described with reference to FIG. 1. Several of the elements of the illumination and detector portion 310 are also similar to those of the illumination and detector portion 110 of FIG. 1, and similarly numbered components may be similar or identical, except as otherwise described below.

The primary difference between the illumination and detector portion 310 and the illumination and detector portion 110 is that a ray bundle position control portion 318 may be characterized as a reflective-type of aperture position adjustment element, whereas the ray bundle position control portion 118 was a transmissive-type aperture position adjustment element. Accordingly, an aperture 320 outputs the projected ray bundle 115 by reflection rather than by direct transmission, and the illumination and detector portion 310 requires a slightly different layout. Otherwise, its operation is analogous to that of the illumination and detector portion 110, including the operation of its ray bundle alignment sensing arrangement, wherein the aperture 320 and the photodetector configuration 130 operate in substantially the same manner as described for the aperture 120 and the photodetector configuration 130 of FIG. 1.

In various embodiments, the ray bundle position control portion 318 may comprise a reflective-type SLM. The SLM may comprise an array of light reflecting and blocking (or deflecting) elements (e.g. a micro-mirror array) and associated control electronics. In one specific embodiment the ray bundle position control portion 318 may comprise a reflective pixel array including gray level control, such as one of the liquid crystal on silicon (LCOS) micro-display products, available from CRL-Opto in Dunfermline, Scotland. In another specific embodiment, it may comprise a digital light projector (DLP) micro-mirror product, available from Texas Instruments DLP Products, Plano, Tex.

Figure 4:
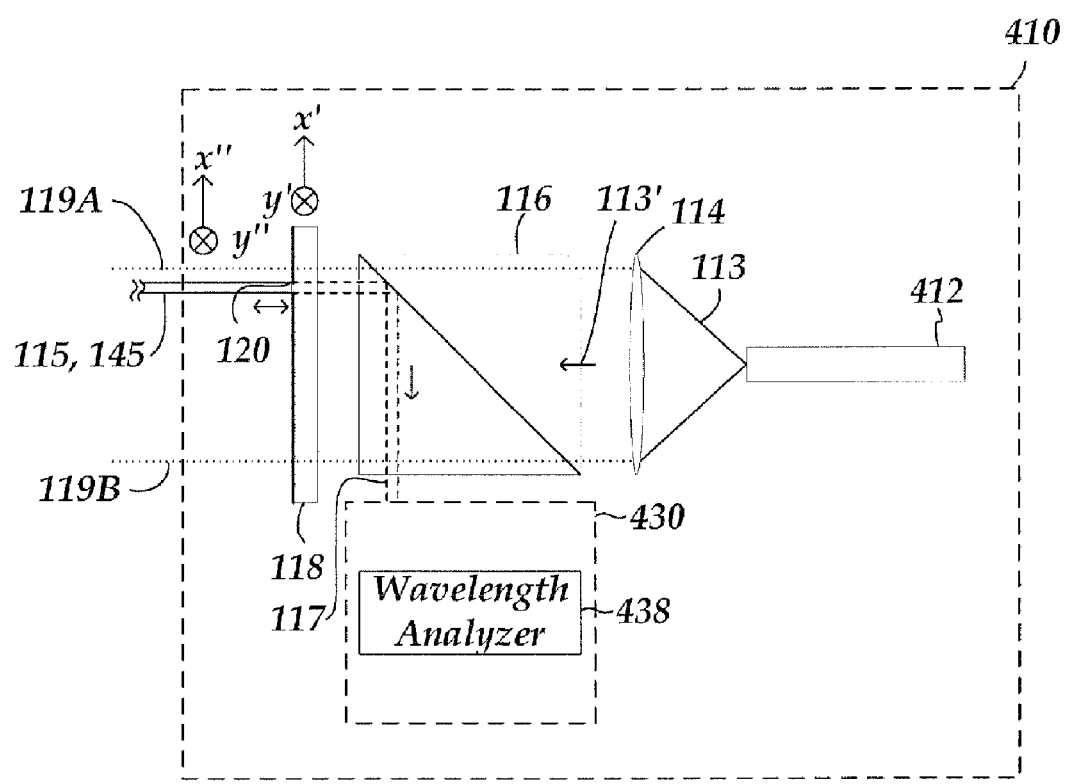
FIG. 4 is a diagram of a fourth embodiment of an illumination and detector portion of an adaptive light-path surface tilt sensor which may provide a ray bundle projected along a direction normal to workpiece surface.

FIG. 4 is a diagram of a fourth embodiment of an illumination and detector portion 410, that may be used in an adaptive light-path surface tilt sensing configuration according to this invention (e.g. in place of the illumination and detector portion 110 in the tilt sensing configuration 100). In operation, the projected ray bundle 115 and the reflected ray bundle 145 may be functionally equivalent to those previously described with reference to FIG. 1. Except for the photodetector configuration 430, the elements of the illumination and detector portion 410 are similar to those of the illumination and detector portion 110 of FIG. 1, and similarly numbered components may be similar or identical, except as otherwise described below.

The primary difference between the illumination and detector portion 410 and the illumination and detector portion 110 is that a photodetector configuration 430 comprises a wavelength analyzer 438 (e.g. spectrometer or spectrophotometer). With the exception of the additional features offered by the wavelength analyzer 438, the operation of the illumination and detector portion 410 is analogous to that of the illumination and detector portion 110, including the operation of its ray bundle alignment sensing arrangement, wherein the aperture 120 and a measurement signal from a photodetector of the photodetector configuration 430 operate in substantially the same manner as described for the aperture 120 and the photodetector configuration 130 of FIG. 1. For example, in one embodiment, for the purposes of ray bundle alignment sensing, a measurement signal indicative of the total amount of measuring signal light 117 may be determined by integrating the intensity information obtained for all wavelengths detected by a linear photodetector array of the wavelength analyzer 438. In another embodiment, the photodetector configuration 430 may include a beamsplitter and a separate photodetector arrangement, in addition to the wavelength analyzer 438. The beam splitter may route a portion of the measuring signal light 117 to the separate photodetector, which may provide the measurement signal that is used for ray bundle alignment sensing.

The wavelength analyzer 438 may determine the dominant wavelengths present in the measuring signal light 117 (and their relative intensities, in some embodiments). In one exemplary method, a projected ray bundle 115 is optimized to be at normal incidence to the workpiece surface and is then used to provide the reflected ray bundle 145 that provides the measurement signal light 117. The dominant wavelengths and/or their relationship to one another may then be used to determine the thickness of a thin film on the workpiece surface 180, given a known index of refraction for the thin film, according to known techniques. It will be appreciated that the wavelength analyzer 428 must be designed to input the measurement signal light 117 from any operative reflection location on the beam splitting surface of the beamsplitter 116. Thus, the wavelength analyzer 428 may generally comprise a known configuration of lenses and/or curved mirrors, or the like, in order to direct all operative paths of the measurement signal light 117 to an entrance slit of the wavelength analyzer 438.

Figure 5:
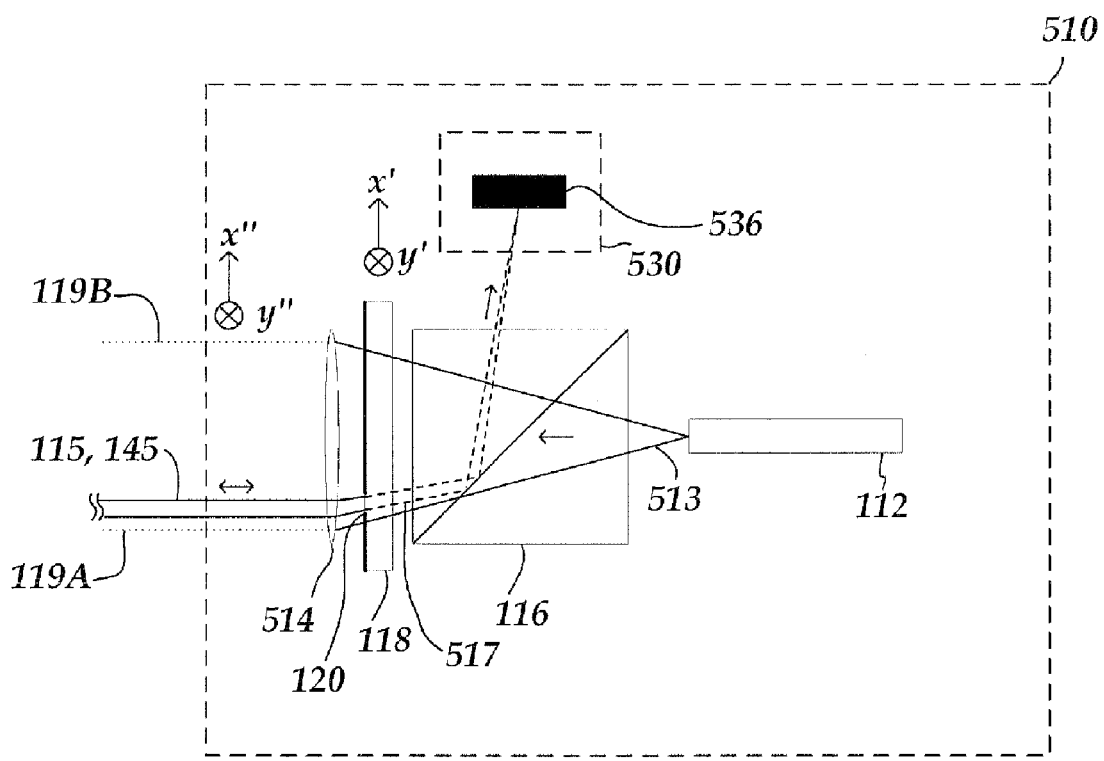
FIG. 5 is a diagram of a fifth embodiment of an illumination and detector portion of an adaptive light-path surface tilt sensor which may provide a ray bundle projected along a direction normal to a workpiece surface.

FIG. 5 is a diagram of a fifth embodiment of an illumination and detector portion 510 that may be used in an adaptive light-path surface tilt sensing configuration according to this invention (e.g. in place of the illumination and detector portion 110 in the tilt sensing configuration 100). In operation, the projected ray bundle 115 and the reflected ray bundle 145 may be functionally equivalent to those previously described with reference to FIG. 1. Several of the elements of the illumination and detector portion 510 are also similar to those of the illumination and detector portion 110 of FIG. 1, and similarly numbered components may be similar or identical, except as otherwise described below.

The main difference between the illumination and detector portion 510 and the illumination and detector portion 110 is the arrangement of the beam splitter 116, the ray bundle position control portion 118, and a collimation lens 614. In operation, the light source 112 outputs a diverging illuminating beam 113 through the beam splitter 116 to the ray bundle position control portion 118, where it is spatially filtered through the aperture 120, and a diverging ray bundle is transmitted to the collimation lens 614. The collimation lens 614 then projects the collimated projected ray bundle 115 with a projected ray bundle position (x",y"). In general, the reflected ray bundle 145 returns to the collimating lens 614, which transmits converging rays toward the ray bundle position control portion 118. The ray bundle position control portion 118 spatially filters the reflected ray bundle 145 using the aperture 120, and may transmit converging spatially filtered measurement signal light 517 if the reflected ray bundle 145 is at least partially aligned with the aperture 120. In the embodiment shown in FIG. 5, the converging spatially filtered measurement signal light 517 is reflected from the beam splitter 116 and converges to a focus or near focus at the photodetector 536 of the photodetector configuration 530. The illumination and detector portion 510 may otherwise operate in a manner similar to that described for the illumination and detector portion 110 of FIG. 1. It will be appreciated that in the embodiment shown in FIG. 5, the ray bundle alignment sensing arrangement comprise the ray bundle position control portion 118 and the photodetector configuration 530.

Figure 6:
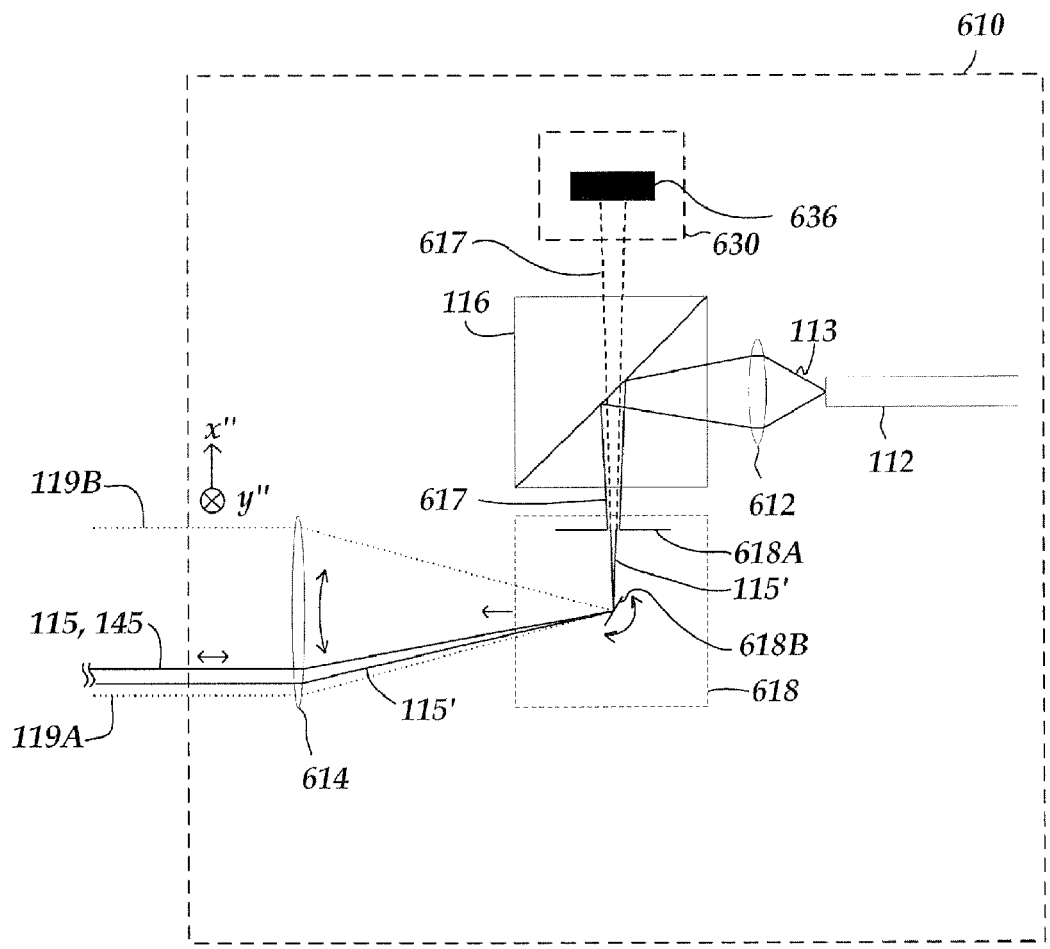
FIG. 6 is a diagram of a sixth embodiment of an illumination and detector portion of an adaptive light-path surface tilt sensor which may provide a ray bundle projected along a direction normal to workpiece surface.

FIG. 6 is a diagram of a sixth embodiment of an illumination and detector portion 610 that may be used in an adaptive light-path surface tilt sensing configuration according to this invention (e.g. in place of the illumination and detector portion 110 in the tilt sensing configuration 100). In operation, the projected ray bundle 115 and the reflected ray bundle 145 may be functionally equivalent to those previously described with reference to FIG. 1. The general operating principles of the illumination and detector portion 610 are similar to those previously described for the illumination and detector portions 110-510. Therefore, only certain differences and features of the illumination and detector portion 610 are described below.

In operation, the light source 112 outputs a diverging illuminating beam 113 through a converging lens 113, to be reflected by the beam splitter 116 to the ray bundle position control portion 618. In the embodiment shown in FIG. 6, the ray bundle position control portion 618 comprises an aperture 618A and a ray bundle direction control element 618B (e.g. a controllable two-axis galvanometer mirror, or an adaptive optical element such as a deformable mirror, or the like). The aperture 618A receives the converging illuminating beam from the beam splitter 116 and may control the size of the intermediate ray bundle 115'. In one embodiment the aperture 618A may comprise a fixed aperture. In another embodiment, the aperture 618A may comprise a SLM that can provide at least some of the same features and benefits previously outlined with reference to the use of SLMs, for example aperture size control and/or apodization may be provided.

The ray bundle direction control element 618B is controlled to deflect the intermediate ray bundle 115' to a selected direction such that it emerges from the collimating lens 614 as a collimated projected ray bundle 115, with a projected ray bundle position (x",y"). Accordingly, it will be understood that "x-y" control signal components of the ray bundle direction control element 618B are analogous to the (x',y') aperture position coordinates outlined with reference to FIG. 1, and may be therefore be mapped to corresponding workpiece surface tilt directions, and otherwise used in an analogous manner.

In general, the reflected ray bundle 145 returns to the collimating lens 614, which transmits converging rays to focus approximately at the ray bundle direction control element 618B. The ray bundle direction control element 618B does not move during a measurement related to a particular projected ray bundle 115, and deflects the converging reflected ray bundle 145 to become a diverging reflected ray bundle that is spatially filtered by the aperture 618A. The aperture 618A provides a diverging spatially filtered measurement signal light 617 if the diverging reflected ray bundle from the ray bundle direction control element 618B is at least partially aligned with the aperture 618A. The diverging spatially filtered measurement signal light 617 is received by the photodetector 636 of the photodetector configuration 630. The illumination and detector portion 610 may otherwise operate in a manner analogous to that described for the illumination and detector portion 110 of FIG. 1. It will be appreciated that in the embodiment shown in FIG. 6, the ray bundle alignment sensing arrangement comprises the ray bundle position control portion 618 and the photodetector configuration 630.

Figure 7:
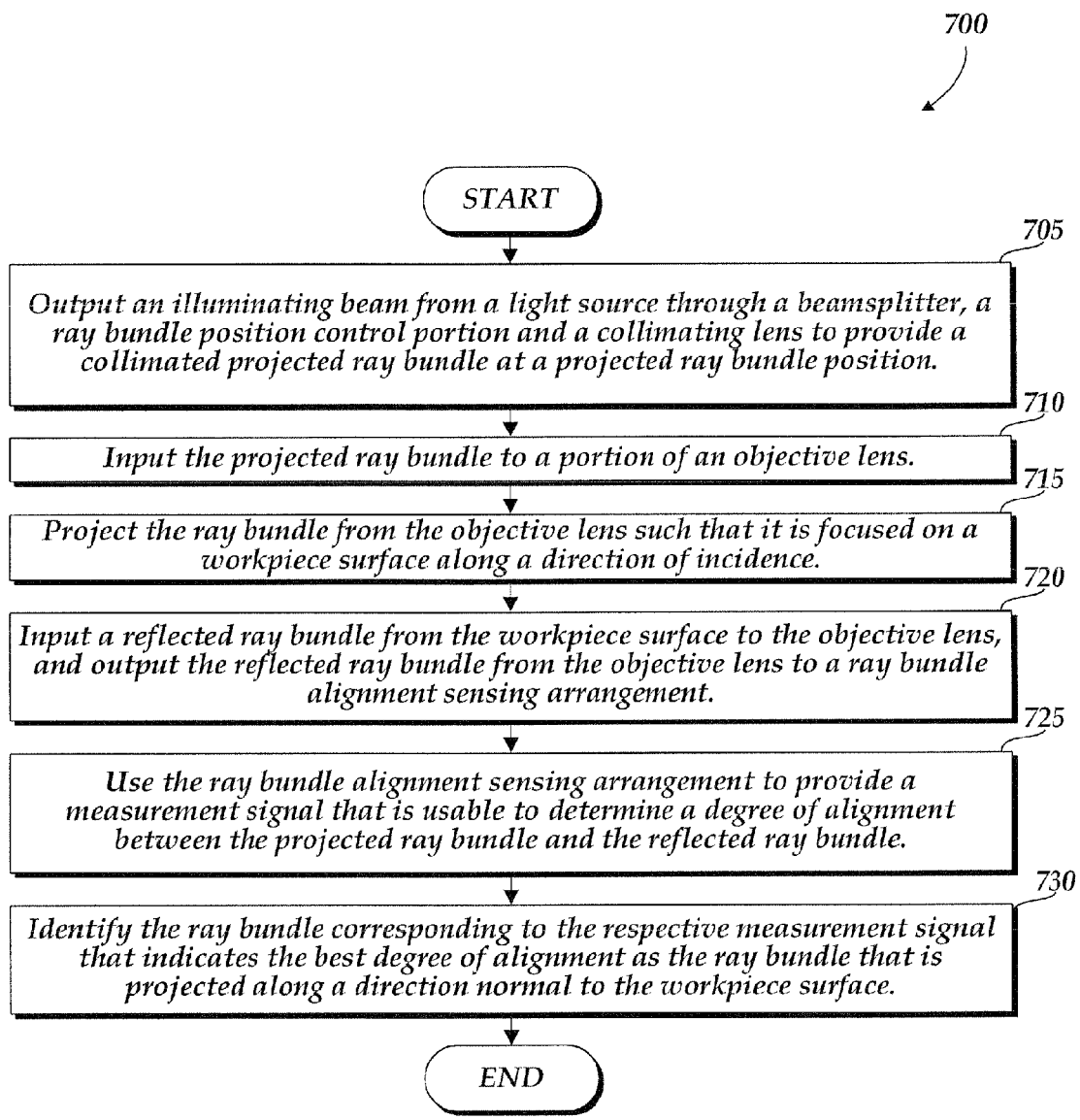
FIG. 7 is a flow diagram illustrating one exemplary embodiment of a routine for identifying a ray bundle that is projected along a direction normal to a workpiece surface according to this invention.

FIG. 7 is a flow diagram illustrating one exemplary embodiment of a routine 700 for identifying a ray bundle that is projected along a direction normal to a workpiece surface according to this invention. The routine 700 begins, and at a block 705 an illuminating beam is output from a light source through an arrangement of a beamsplitter, a ray bundle position control portion, and a collimating lens, to provide a collimated projected ray bundle at a projected ray bundle position. In a various respective embodiments, the beamsplitter, the ray bundle position control portion, and the collimating lens may be arranged in various respective orders along a beam path, as outlined previously herein. At a block 710, the collimated projected ray bundle is input to a portion of an objective lens. At a block 715, the projected ray bundle is projected from the objective lens such that it is focused on a workpiece surface along a direction of incidence. At a block 720, a reflected ray bundle from the workpiece surface is input to the objective lens and is output from the objective lens to a ray bundle alignment sensing arrangement. At a block 725, the ray bundle alignment sensing arrangement is used to provide a measurement signal that is usable to determine a degree of alignment between the projected ray bundle and the reflected ray bundle. At a block 730, a ray bundle corresponding to the respective measurement signal that indicates the best degree of alignment is identified as the ray bundle that is projected along the direction normal to the workpiece surface, and the routine ends.

It should be appreciated that, in various embodiments, the ray bundle alignment sensing arrangement that outputs a measurement signal in the operation at block 725 and the respective measurement signal that indicates the best degree of alignment in the operations at block 730, may take any of the compatible forms outlined previously herein with reference to the operation of the illumination and detector portions 110, 210, 310, 410, 510 and 610, or any other similar form that is in accordance with the principles of this invention as disclosed herein.

In various exemplary embodiments according to this invention, the range of surface tilt measurement is limited to correspond to the numerical aperture (NA) of the objective lens (e.g. +/− 44 degrees for NA=0.7). Using practical and economical components, it is reasonable to provide an aperture 120 and/or a projected ray bundle 115 with a dimension on the order of 100 microns, and a position adjustably on the order of one part in 1000 or better along the range of the x" and y" projected ray bundle position axes. Accordingly, surface tilt angular measurement resolution on the order of 0.001 times the angular measurement range corresponding to the NA, or better (e.g. on the order of 0.044 degrees, or better, for NA=0.7) may be provided. More generally, in various embodiments, a surface tilt measuring configuration according to this invention may provide surface tilt angular measurement resolutions of at least 0.1 degree, 0.05 degree, 0.01 degrees, and better, depending on the NA of the objective lens in combination with other characteristics of the configuration.

While the preferred embodiment of the invention has been illustrated and described, numerous variations in the illustrated and described arrangements of features and sequences of operations, as well as additional types of surface inspection and measurement that may be performed using such variations, will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An adaptive light-path surface tilt sensing configuration that can be used to identify a ray bundle that is projected along a direction normal to a point on a workpiece surface, the tilt sensing configuration comprising:
an objective lens; and
an illumination and detector portion including elements comprising a light source, a collimating lens, a beamsplitter, a ray bundle position control portion comprising an aperture, and a photodetector configuration,
wherein:
a portion of the tilt sensing configuration forms a ray bundle alignment sensing arrangement; and
the tilt sensing configuration is configured such that:
an illuminating beam from the light source is output via an arrangement of the collimating lens, the beamsplitter and the aperture of the ray bundle position control portion to provide a collimated projected ray bundle at a projected ray handle position;

a portion of the objective lens inputs the projected ray handle and projects the projected ray bundle such that it is focused at a point on the workpiece surface along a direction of incidence;

the objective lens inputs a reflected ray bundle from the workpiece surface and outputs the reflected ray bundle to the ray bundle alignment sensing arrangement;

the ray bundle alignment sensing arrangement outputs a measurement signal that is usable to determine a degree of alignment between the projected ray bundle and the reflected ray bundle, the degree of alignment between the projected ray bundle and the reflected ray bundle corresponding to a degree of alignment between the projected ray bundle and a surface normal at the point on the workpiece surface;

when the measurement signal indicates that a projected ray bundle and a reflected ray bundle are aligned, then that projected ray bundle is identified as the ray bundle that is projected along a direction normal to the point on the workpiece surface, and a corresponding state of the ray bundle position control portion is indicative of the workpiece surface tilt direction at the point on the workpiece surface.

2. The surface tilt sensing configuration of claim 1, wherein the ray bundle position control portion comprises at least one of a controllable aperture position adjustment element and a ray bundle direction control element.

3. The surface tilt sensing configuration of claim 1, wherein the ray bundle position control portion comprises the controllable aperture position adjustment element, which comprises one of a transmissive pixel array, (b) a transmissive pixel array including gray level control, (c) a reflective pixel array, (d) a reflective pixel array including gray level control, and (e) a micro-mirror array.

4. The surface tilt sensing configuration of claim 1, wherein the portion of the tilt sensing configuration that forms the ray bundle alignment sensing arrangement comprises the ray bundle position control portion and the photodetector configuration, and the tilt sensing configuration is further configured such that:

the objective lens inputs the reflected ray bundle from the workpiece surface and outputs the reflected ray bundle to the ray bundle position control portion, which spatially filters the reflected ray bundle using the aperture to provide an amount of spatially filtered measurement signal light, wherein the better the degree of alignment between the projected ray bundle and the reflected ray bundle, the greater the amount of spatially filtered measurement signal light; and the amount of spatially filtered measurement signal light is input to the photodetector configuration, which outputs a measurement signal that has a value corresponding to the amount of spatially filtered measurement signal light.

5. The surface tilt sensing configuration of claim 4, wherein the photodetector configuration comprises a wavelength analyzer, and the photodetector configuration furthermore outputs a measurement signal that may be used to determine the dominant wavelengths present in the spatially filtered measurement signal light.

6. The surface tilt sensing configuration of claim 5, wherein the measurement signal that has a value corresponding to the amount of spatially filtered measurement signal light and the measurement signal that may be used to determine the dominant wavelengths present in the spatially filtered measurement signal light, are the same measurement signal.

7. The surface tilt sensing configuration of claim 1, wherein:

the ray bundle position control portion comprises a controllable aperture position adjustment element that controls the position of the aperture;

the photodetector configuration comprises a two-dimensional photodetector array;

the illumination and detector portion further comprises an alignment mapping that pairs each position on the two-dimensional photodetector array to a corresponding aperture position on the aperture position adjustment element, under the condition that the projected and reflected ray bundles are aligned for the paired positions;

the portion of the tilt sensing configuration that forms the ray bundle alignment sensing arrangement comprises the aperture position adjustment element, the two-dimensional photodetector array, and the alignment mapping; and the tilt sensing configuration is further configured such that:

the objective lens inputs the reflected ray bundle from the workpiece surface and outputs the reflected ray bundle to the two-dimensional photodetector array; and the two-dimensional photodetector array outputs a measurement signal that indicates a spot position of the reflected ray bundle on the two-dimensional photodetector array, wherein when the reflected ray bundle returns to a spot position on the two-dimensional photodetector array that maps to a current aperture position on the aperture position adjustment element according to the alignment mapping, then the projected ray bundle projected from the current aperture position is identified as the ray bundle that is projected along a direction normal to a point on a workpiece surface.

8. The surface tilt sensing configuration of claim 7, wherein:

the illumination and detector portion further comprises a tilt mapping that maps each respective aperture position to a corresponding known surface tilt direction, under the condition that the projected ray bundle and the reflected ray bundle are aligned when the projected ray bundle projected from that respective aperture position is projected to a surface having the corresponding known tilt direction; and when the measurement signal indicates that a current projected ray bundle and a reflected ray bundle are aligned, the surface tilt direction at the point on the workpiece surface is determined based on the current aperture position and the tilt mapping.

9. The surface tilt sensing configuration of claim 1, wherein:

the photodetector configuration comprises a two-dimensional photodetector array;

the ray bundle position control portion includes a ray bundle direction control element having respective sets of ray bundle direction control components that determine respective projected ray bundle positions;

the aperture is located between the beamsplitter and the light source;

the illumination and detector portion further comprises an alignment mapping that pairs each position on the two-dimensional photodetector array to a corresponding respective set of ray bundle direction control components, under the condition that the projected and reflected ray bundles are aligned for the paired positions and respective sets of ray bundle direction control components;

the portion of the tilt sensing configuration that forms the ray bundle alignment sensing arrangement comprises the ray bundle direction control element, the two-dimensional photodetector array, and the alignment mapping; and the tilt sensing configuration is further configured such that:

the objective lens inputs the reflected ray bundle from the workpiece surface and outputs the reflected ray bundle to the ray bundle direction control element and the two-dimensional photodetector array; and the two-dimensional photodetector array outputs a measurement signal that indicates a spot position of the reflected ray bundle on the two-dimensional photodetector array, wherein when the reflected ray bundle returns to a spot position on the two-dimensional photodetector array that maps to a current set of ray bundle direction control components according to the alignment mapping, then the current projected ray bundle is identified as the ray bundle that is projected along a direction normal to a point on a workpiece surface.

10. The surface tilt sensing configuration of claim 9, wherein:

the illumination and detector portion further comprises a tilt mapping that maps each respective set of ray bundle direction control components to a corresponding known surface tilt direction, under the condition that the projected ray bundle and the reflected ray bundle are aligned when the projected ray bundle projected according to that respective set of ray bundle direction control components is projected to a surface having the corresponding known tilt direction; and when the measurement signal indicates that a current projected ray bundle and a reflected ray bundle are aligned, the surface tilt direction at the point on the workpiece surface is determined based on the current set of ray bundle direction control components and the tilt mapping.

11. The surface tilt sensing configuration of claim 1, wherein the surface tilt sensing configuration is integrated with a machine vision inspection system and the objective lens comprises a lens that is used for acquiring workpiece inspection images in the machine vision inspection system.

12. The surface tilt sensing configuration of claim 1, wherein:

the ray bundle position control portion includes a ray bundle direction control element having respective sets of ray bundle direction control components that determine respective projected ray bundle positions; and the aperture is located between the beamsplitter and the ray bundle direction control element.

13. A method for identifying that a ray bundle is projected along a direction normal to a point on a workpiece surface, the method comprising:

providing a surface tilt sensing configuration comprising an objective lens and an illumination and detector portion including elements comprising a light source, a collimating lens, a beamsplitter, a ray bundle position control portion comprising an aperture, and a photodetector configuration, wherein a portion of the tilt sensing configuration forms a ray bundle alignment sensing arrangement;

outputting an illuminating beam from the light source via an arrangement of the collimating lens, the beamsplitter and the aperture of the ray bundle position control portion to provide a collimated projected ray bundle at a projected ray bundle position;

inputting the projected ray bundle to a portion of the objective lens and using the objective lens to project the projected ray bundle such that it is focused at a point on the workpiece surface along a direction of incidence;

inputting a reflected ray bundle from the workpiece surface to the objective lens and outputting the reflected ray bundle from the objective lens to the ray bundle alignment sensing arrangement;

using the ray bundle alignment sensing arrangement to output a measurement signal that is usable to determine a degree of alignment between the projected ray bundle and the reflected ray bundle, the degree of alignment between the projected ray bundle and the reflected ray bundle corresponding to a degree of alignment between the projected ray bundle and a surface normal at the point on the workpiece surface; and when the measurement signal indicates that a projected ray bundle and a reflected ray bundle are aligned, then identifying that projected ray bundle as the ray bundle projected along a direction normal to the point on the workpiece surface, wherein a corresponding state of the ray bundle position control portion is indicative of the workpiece surface tilt direction at the point on the workpiece surface.

14. The method of claim 13, wherein operating the ray bundle position control portion comprises operating at least one of a controllable aperture position adjustment element and a ray bundle direction control element.

15. The method of claim 13, wherein:

the portion of the tilt sensing configuration that forms the ray bundle alignment sensing arrangement comprises the ray bundle position control portion and the photodetector configuration;

outputting the reflected ray bundle from the objective lens to the ray bundle alignment sensing arrangement comprises outputting the reflected ray bundle to the ray bundle position control portion; and using the ray bundle alignment sensing arrangement to output a measurement signal that is usable to determine the degree of alignment between the projected ray bundle and the reflected ray bundle comprises:

using the aperture of the ray bundle position control portion to spatially filter the reflected ray bundle to provide an amount of spatially filtered measurement signal light, wherein the better the degree of alignment between the projected ray bundle and the reflected ray bundle, the greater the amount of spatially filtered measurement signal light, inputting the amount of spatially filtered measurement signal light to the photodetector configuration, and outputting a measurement signal from the photodetector configuration that has a value corresponding to the amount of spatially filtered measurement signal light.

16. The method of claim 15, wherein the photodetector configuration comprises a wavelength analyzer, and the method further comprises outputting a measurement signal from the photodetector configuration that may be used to determine the dominant wavelengths present in the spatially filtered measurement signal light.

17. The method of claim 16, wherein the method further comprises:

projecting a projected ray bundle along a direction normal to a point on a workpiece surface that includes a material that forms a thin film on the workpiece surface, and inputting the corresponding spatially filtered measurement signal light to the photodetector configuration;

outputting a corresponding measurement signal from the photodetector configuration that may be used to determine the dominant wavelengths present in the corresponding spatially filtered measurement signal light;

determining the dominant wavelengths based on the corresponding measurement signal;

providing an index of refraction for the material that forms the thin film; and determining the thickness of a thin film on the workpiece surface based on the provided index of refraction and the determined dominant wavelengths.

18. The method of claim 13, wherein:

the ray bundle position control portion comprises a controllable aperture position adjustment element that controls the position of the aperture;

the photodetector configuration comprises a two-dimensional photodetector array;

the illumination and detector portion further comprises an alignment mapping that pairs each position on the two-dimensional photodetector array to a corresponding aperture position on the aperture position adjustment element, under the condition that the projected and reflected ray bundles are aligned for the paired positions;

the portion of the tilt sensing configuration that forms the ray bundle alignment sensing arrangement comprises the aperture position adjustment element, the two-dimensional photodetector array, and the alignment mapping;

outputting the reflected ray bundle from the objective lens to the ray bundle alignment sensing arrangement comprises outputting the reflected ray bundle to the two-dimensional photodetector array; and using the ray bundle alignment sensing arrangement to output a measurement signal that is usable to determine the degree of alignment between the projected ray bundle and the reflected ray bundle comprises:

operating the two-dimensional photodetector array to output a measurement signal that indicates a spot position of the reflected ray bundle on the two-dimensional photodetector array, wherein when the reflected ray bundle returns to a spot position on the two-dimensional photodetector array that maps to a current aperture position on the aperture position adjustment element according to the alignment mapping, then the projected ray bundle projected from the current aperture position is identified as the ray bundle projected along a direction normal to a point on a workpiece surface.

19. The method of claim 18, wherein the illumination and detector portion further comprises a tilt mapping that maps each respective aperture position to a corresponding known surface tilt direction, under the condition that the projected ray bundle and the reflected ray bundle are aligned when the projected ray bundle projected from that respective aperture position is projected to a surface having the corresponding known tilt direction, and the method further comprises:

determining a workpiece surface tilt direction at the point on the workpiece surface, when the measurement signal indicates that a current projected ray bundle and a reflected ray bundle are aligned, based on the current aperture position and the tilt mapping.

20. The method of claim 13, wherein:

the photodetector configuration comprises a two-dimensional photodetector array;

the ray bundle position control portion includes a ray bundle direction control element having respective sets or ray bundle direction control components that determine respective projected ray bundle positions;

the aperture is located between the beamsplitter and the light source;

the illumination and detector portion further comprises an alignment mapping that pairs each position on the two-dimensional photodetector array to a corresponding respective set of ray bundle direction control components, under the condition that the projected and reflected ray bundles are aligned for the paired positions and respective sets of ray bundle direction control components;

the portion of the tilt sensing configuration that forms the ray bundle alignment sensing arrangement comprises the ray bundle direction control element, the two-dimensional photodetector array, and the alignment mapping;

outputting the reflected ray bundle from the objective lens to the ray bundle alignment sensing arrangement comprises outputting the reflected ray bundle to the ray bundle direction control element and the two-dimensional photodetector array; and using the ray bundle alignment sensing arrangement to output a measurement signal that is usable to determine the degree of alignment between the projected ray bundle and the reflected ray bundle comprises:

operating the two-dimensional photodetector array to output a measurement signal that indicates a spot position of the reflected ray bundle on the two-dimensional photodetector array, wherein when the reflected ray bundle returns to a spot position on the two-dimensional photodetector array that maps to a current set of ray bundle direction control components according to the alignment mapping, then the projected ray bundle corresponding to the current set of ray bundle direction control components is identified as the ray bundle that is projected along a direction normal to a point on a workpiece surface.

21. The method of claim 20, wherein the illumination and detector portion further comprises a tilt mapping that maps each respective set of ray bundle direction control components to a corresponding known surface tilt direction, under the condition that the projected ray bundle and the reflected ray bundle are aligned when the projected ray bundle projected according to that respective set of ray bundle direction control components is projected to a surface having the corresponding known surface tilt direction, and the method further comprises:

determining a workpiece surface tilt direction at the point on the workpiece surface, when the measurement signal indicates that a current projected ray bundle and a reflected ray bundle are aligned, based on the set of ray bundle direction control components and the tilt mapping.

22. The method of claim 13, wherein providing the surface tilt sensing configuration comprises providing the surface tilt sensing configuration in a form that is integrated with a machine vision inspection system, such that the objective lens comprises a lens that is used for acquiring workpiece inspection images in the machine vision inspection system.

23. The method of claim 13, wherein the method further comprises:

operating the ray bundle position control portion to provide a plurality of respective aperture positions that output respective projected ray bundles corresponding to respective reflected ray bundles and respective measurement signals, including an aperture position that outputs a projected ray bundle that is projected along the direction normal to the workpiece surface; and when a respective measurement signal indicates that a respective projected ray bundle and a corresponding respective reflected ray bundle are aligned, then identifying that respective projected ray bundle as the ray bundle projected along a direction normal to a point on a workpiece surface.

24. The method of claim 13, wherein the method further comprises:

operating the ray bundle position control portion to provide a plurality of respective aperture positions that output respective projected ray bundles projected at corresponding respective directions of incidence of the workpiece surface in order to provide corresponding respective measurement signals, including an aperture position that outputs a projected ray bundle that is projected along the direction normal to the workpiece surface; and characterizing a surface finish of the workpiece surface based on characterizing the values of the corresponding respective measurement signals as a function of the corresponding respective directions of incidence.

* * * * *

UNITED STATES PATENT AND TRADEMARK OFFICE
CERTIFICATE OF CORRECTION

PATENT NO. : 7,433,128 B2
APPLICATION NO. : 11/694795
DATED : October 7, 2008
INVENTOR(S) : J. D. Tobiason It is certified that error appears in the above-identified patent and that said Letters Patent is hereby corrected as shown below:

| | LINE | ERROR |
|---|---|---|
| TITLE PAGE, ITEM (10) | Patent No. | "US 7,433,128 B1" should read --US 7,433,128 B2-- |
| TITLE PAGE, ITEM (65) | Prior Publication Data | insert in appropriate order --(65) Prior Publication Data US 2008/0239298 A1 Oct. 2, 2008-- |
| TITLE PAGE, ITEM (57) | Abstract 15 of text | "surface provides." should read --surface.-- |
| 12 (Claim 1, line 18) | 67 | "handle" should read --bundle-- |
| 13 (Claim 1, line 21) | 2 | "handle" should read --bundle-- |
| 15 (Claim 9, line 30) | 16 | double indent the clause beginning "the two-dimensional photodetector array...." |
| 17 (Claim 17, line 15) | 15 | indent the phrase beginning "determining the thickness of a thin film...." |

| COLUMN | LINE | ERROR |
|---|---|---|
| 18 (Claim 20, line 6) | 7 | "or ray" should read --of ray-- |
| 20 (Claim 24, line 6) | 6 | "incidence of" should read --incidence to-- |

Signed and Sealed this

Sixth Day of April, 2010

David J. Kappos
*Director of the United States Patent and Trademark Office*